US006723244B1

(12) United States Patent
Constantine (10) Patent No.: US 6,723,244 B1
(45) Date of Patent: Apr. 20, 2004

(54) METHOD AND APPARATUS TO ACHIEVE NITRIFICATION AT LOW SOLIDS RETENTION TIMES

(75) Inventor: Timothy Allan Constantine, Whitby (CA)

(73) Assignee: CH2M Hill, Inc., Englewood, CO (US)

( * ) Notice: Subject to any disclaimer, the term of this patent is extended or adjusted under 35 U.S.C. 154(b) by 279 days.

(21) Appl. No.: 09/976,678

(22) Filed: Oct. 12, 2001

(51) Int. Cl.$^7$ ................................................. C02F 3/00
(52) U.S. Cl. .................... 210/607; 210/624; 210/195.1; 210/626
(58) Field of Search ................................ 210/607, 624, 210/195.1, 620–626, 194–197

(56) References Cited

U.S. PATENT DOCUMENTS 5,811,009 A  9/1998  Kos
6,312,599 B1 * 11/2001  Reid ........................... 210/605

OTHER PUBLICATIONS

Anthonisen et al. (1976) Journal WPCF 48:835–852.
Bidstrup et al. (1988) Journal WPCF 60:351–361.
Biological Wastewater Treatment (Grady, et al. eds., 2d ed. 1999) pp. 208–211, 355, 405, 406.
Constantine (1996) Masters Thesis, McMaster University, "Bioaugmentation to Achieve Nitrification in Activated Sludge Systems," p. 3.
Crawford, et al. (2000) Proceedings of the 29th WEAO Conference and Technical Symposium, Hamilton, Ontario.
Daigger et al. (1993) Water Environment Research 65:750–758.
Kos (1998) Wat. Sci. Tech. vol. 38:23–29.
Tendaj–Xavier (1983) Dissertation, Royal Technical University,"Biological Treatment of Sludge Water from Centrifugation of Digested Sludge," pp. 15–18.
U.S. Environmental Protection Agency (1993) Process Design Manual for Nitrogen Control EPA/625/R–93/010, p. 131.

* cited by examiner

Primary Examiner—Chester T Barry
(74) Attorney, Agent, or Firm—Swanson & Bratschun LLC (57) ABSTRACT

A new process configuration, which is based on nitrifier bioaugmentation, achieves essentially complete nitrification at low solids retention times (SRTs) on a year round basis for plants that have a minimum of two activated sludge treatment trains. The process utilizes a membrane bioreactor as a second stage activated sludge system for one of the existing activated sludge systems, which is operated under non-nitrifying conditions. The membrane bioreactor is used to achieve essentially complete nitrification of ammonia derived from influent wastewater and an anaerobic digester recycle stream. The mixed liquor of the membrane bioreactor is comprised of an enriched culture of nitrifying bacteria. To allow the other treatment train(s) to nitrify, the waste sludge from the membrane bioreactor is directed to "donated" to the other "receiver" train(s).

17 Claims, 7 Drawing Sheets

METHOD AND APPARATUS TO ACHIEVE NITRIFICATION AT LOW SOLIDS RETENTION TIMES

FIELD OF THE INVENTION

This invention relates to nitrification in activated sludge systems at low solids retention times, and more particularly, to use of a second stage activated sludge system in conjunction with another activated sludge system to achieve nitrification of ammonia derived from the influent wastewater using the concept of nitrifier bioaugmentation or seeding.

BACKGROUND OF THE INVENTION

Discharge of ammonia from municipal wastewater treatment plants (WWTPs) has becomes more stringently regulated over the last two decades. The un-ionized form of ammonia is toxic to aquatic life, and as such, its presence in WWTP effluents is often restricted.

Nitrification is a two-step biologically mediated conversion of ammonia to nitrate and is the most common method of achieving ammonia removal from municipal wastewaters. Nitrifying bacteria have a much lower specific growth rate than the heterotrophic organisms that are responsible for carbonaceous removal and are predominant in the activated sludge process. The specific growth rate of nitrifiers is also strongly dependent on the wastewater characteristics and temperature. Winter wastewater temperatures in northern climates can range from 10° C. to 12° C. or lower. Relatively high solids retention times (SRTs), typically greater than eight days, are generally required to ensure year round nitrification.

A problem faced by many municipalities is the need to either meet new or more stringent limits for ammonia when plant expansion is required. Plants previously designed to provide only carbonaceous removal require substantial modifications that can include de-rating of existing facilities to meet the new ammonia limits. This results from the fact that nitrifiers, the autotrophic organisms that carry on ammonia oxidation, have a lower maximum specific growth rate compared to the heterotrophic organisms that dominate activated sludge processes. In addition, the nitrifier maximum specific growth rate decreases markedly with temperature (Grady et al., (1999) Biological Wastewater Treatment, Second Edition, Marcel Dekker, N.Y.). Therefore, the solids retention time (SRT) at which a nitrifying system needs to be operated has to be sufficiently long to ensure that an adequate nitrifier population remains in these systems.

Wastewater treatment plants that were designed for removing carbonaceous material often operate at relatively low SRTs (i.e. 5 days or less) and their aeration and secondary clarifier tankage is sized accordingly. At these SRTs, year round nitrification is not normally possible, especially at the low temperatures that are encountered during the winter months in northern climates (e.g. 10° C. and 12° C.). Increasing the SRT will result in an increase in the mixed liquor suspended solids (MLSS) concentrations, and frequently the existing secondary clarifiers do not have the capacity to operate at these augmented MLSS concentrations and solids loadings. The traditional approach to allow such plants to provide nitrification is through the construction of additional aeration and secondary clarifiers. As such, significant capital expenditure is typically required to provide for year round nitrification and this has lead to the investigation of different strategies that allow this upgrade to be achieved in a more cost effective manner.

A common theme of many of these strategies is the concept of nitrifier bioaugmentation, which makes use of a separate seed source of nitrifiers fed to a low SRT reactor to support nitrification (Constantine, Bioaugmentation to Achieve Nitrification in Activated Sludge Systems, Masters Thesis, McMaster University 1996). One of the earlier manifestations of bioaugmentation was in certain trickling filters/activated sludge processes, where partial nitrification takes place in the trickling filter (Daigger, et al. (1993). Process and Kinetic Analysis of Nitrification in Coupled Trickling Filter/Activated Sludge Processes. *Water Environment Research*, Vol. 65, pp. 679–685.). Nitrifiers growing in the trickling filter will slough off and enter the activated sludge process. This is an example of bioaugmentation, where nitrifiers growing in the trickling filter will seed the activated sludge process, allowing its operation at a decreased SRT, while still providing stable nitrification.

Another example of nitrifier bioaugmentation is given by the work of Constantine (1996). Two parallel sequencing batch reactors (SBR) were operated at two different SRTs. One of the SBRs was operated at an elevated SRT, so that nitrification would always occur in this system, and this reactor was referred to as the "Donor" reactor. The other SBR was operated at a low SRT that would not allow nitrification to proceed, and this reactor was referred to as the "Receiver" reactor. Waste activated sludge (WAS) was directed from the Donor to the Receiver reactor, resulting in a constant supply of nitrifiers to the Receiver reactor. This allowed stable nitrification to take place in the Receiver reactor, at SRTs that would not normally allow nitrification to proceed were it not for bioaugmentation. The major drawback of this approach is that along with nitrifiers, a significant amount of non-nitrifier material is associated with the WAS, leading to a significant impact on the MLSS concentration of the Receiver reactor.

Bioaugmentation was also described in a two-stage process by Tendaj-Xavier, 1983 (Tendaj-Xavier (1983). Biological Treatment of Sludge Water from from Centrifugation of Digested Sludge, Dissertation, Royal Technical University). The dissertation generally suggests growing nitrification bacteria on a portion of the wastewater stream and seeding the nitrified bacteria into the remaining stream. The Dissertation reports that the process arrangement requires a high investment cost. Also, the process could not be used at the desired facility due to the lack of space required for the process configuration that grows the nitrifiers.

The process reported in Kos (Kos, P. (1998). Short SRT (Solids Retention Time) Nitrification Process/Flowsheet *Wat. Sci. Tech.*, Vol. 38, No. 1, pp. 23–29.), and described in U.S. Pat. No. 5,811,009, also relies on the concept of bioaugmentation and this process configuration mitigates some of the drawbacks of the process proposed by Constantine (1996). In this case, a sidestream reactor, distinct from the mainstream, treats the recycle stream from anaerobic digesters (e.g., supernatant or dewatering centrate). These recycle streams are rich in ammonia, which is released during anaerobic digestion, thereby allowing the generation of an enriched culture of nitrifiers in this sidestream reactor. An additional benefit is that the temperature of these recycle streams is typically high, which is favorable for nitrification. Kos (1998) demonstrated, through steady-state simulation, that this application of nitrifier bioaugmentation allowed nitrification to proceed in the mainstream process at reduced SRTs. Therefore, the process reported in Kos (1998) would require somewhat less secondary treatment tankage compared to a traditional nitrification system.

This process configuration suffers from a number of potential problems especially with respect to the sidestream plant operation, including the potential of high supplementary alkalinity requirements to maintain process stability; possible process instability associated with substrate and product inhibition as described in Anthonisen, et al. (1976) Inhibition of nitrification by ammonia and nitrous acid, *Journal of the Water Pollution Control Federation,* Vol. 48, pp. 835–852. The system also has the potential of poor SRT maintenance, as enriched nitrifier cultures are known to possess poor settling characteristics (U.S. Environmental Protection Agency, (1993). Process Design Manual for Nitrogen Control, EPA/625/R-93/010, U.S. Environmental Protection Agency, Cincinnati, Ohio.). Additionally, the amount of nitrifiers formed in the mainstream is largely a function of the dose of nitrifiers from the sidestream. The process also results in an extremely high mass of total mixed liquor suspended solids under aeration. Another concern is whether the process configuration proposed by Kos (1998) is as effective under dynamic conditions (such as changes in the normal diurnal variation in wastewater flow and load) as it is under steady-state operation.

Accordingly, there remains a need for a new process configuration to allow year round nitrification, while maintaining the relatively low SRTs typical of conventional activated sludge (CAS). Also needed is a process configuration minimizing the quantity of solids under aeration. Further needed is a process configuration readily adaptable to existing treatment plants requiring a minimum amount of space to install. A process configuration operable at relatively low temperatures and requiring a minimum amount of supplemental chemicals is also highly desirable.

The present invention is intended to overcome one or more of the problems discussed above.

Various publications and patents have been referred to herein. These publications are incorporated by reference herein in their entirety.

SUMMARY OF THE INVENTION

The present invention provides a wastewater treatment process providing nitrification comprising subjecting a first stream of influent having an ammonia concentration to a first BOD removal treatment process to yield a first effluent, subjecting a second stream of influent to a second activated sludge process, subjecting the first effluent to a second stage reactor capable of growing nitrifiers and nitrifying the first effluent to generate nitrifier-enriched effluent, and adding a portion of this nitrifier-enriched effluent to the second stream of influent to promote nitrification in the second stream activated sludge process.

The present invention also provides a wastewater treatment plant comprising a first BOD removal treatment process receiving a first stream of wastewater influent and emitting an effluent, a second stream activated sludge process receiving a second stream of influent wastewater, a second stage nitrification reactor receiving the effluent from the first BOD removal treatment process, the second stage nitrification reactor operating at an SRT sufficient to provide essentially complete nitrification and to grow nitrifiers, and means for conveying a portion of the biomass produced, containing nitrifiers, from the second stage nitrification reactor to the second stream activated sludge process to provide nitrification in the second stream activated sludge process.

The present invention further provides a method for modifying an activated sludge process configuration to enhance ammonia nitrification, comprising providing an existing wastewater treatment plant comprising a first activated sludge process and a second activated sludge process, providing a second stage reactor for nitrification and to grow nitrifiers in fluid communication with an effluent from the first activated sludge process, and providing a means for directing a portion of the biomass produced from the second stage reactor to the second activated sludge process such as a closed conduit or open channel.

The present invention overcomes many of the disadvantages of prior treatment processes including Kos (1998). Among the most significant advantages of the present invention are use of a mainstream process to provide supplemental nitrifiers which also treats a significant percentage of the influent wastewater flow and discharges this treated flow as final effluent. This makes the system adaptable to existing treatment plants without significantly degrading throughput. Use of the preferred membrane bioreactor also minimizes the space necessary to implement the process, further making it useful for retrofitting existing plants. The ability of the process configuration to operate at low temperatures allows for its use in colder climates. Minimizing the solids subject to aeration by producing nitrifiers from a clarified secondary effluent further improves plant efficiency. In addition, in almost all applications the process configuration requires no use of supplemental chemicals.

DETAILED DESCRIPTION OF THE INVENTION

This present invention is directed toward a new process configuration to allow year round nitrification, while maintaining the relatively low SRTs typical of conventional activated sludge (CAS). The new process utilizes nitrifier bioaugmentation, and it further mitigates some of the limitations and concerns associated with the process described in Kos (1998).

In general, the activated sludge process can be described as follows. Wastewater is aerated in a tank. Bacteria are encouraged to grow by providing oxygen, food (reported as biological oxygen demand, or BOD) at a suitable temperature for a suitable amount of time. As bacteria consume BOD, they grow and multiply. Treated wastewater flows into secondary clarifier. Bacterial cells settle, and are removed from clarifier as sludge. Part of the sludge is recycled back to activated sludge tank, to maintain the appropriate bacteria population. There are many variations on the basic activated sludge process, including but not limited to complete-mix, step-aeration, modified-aeration, contact-stabilization, extended-aeration, Kraus process, high-rate aeration, and pure-oxygen. It is to be understood that although reference is made herein to a conventional activated sludge (CAS) process, any modification of basic process, including those listed, can be used in conjunction with the present invention. Other modifications are also possible. For example, the sedimentation basin of a conventional activated sludge wastewater treatment system may be replaced with a membrane bioreactor system to improve the separation of activated sludge and effluent, or a sponge or other fixed film media may used as a support carrier to adhere microorganisms, thereby acting as an activated sludge on the surface of the media. Other modifications will be apparent to those skilled in the art.

The process configuration of the present invention comprises a Donor Plant and a Receiver Plant. It is to be noted that the term "a" or "an" entity refers to one or more of that entity; for example, a Donor Plant refers to one or more Donor Plants. As such, the terms "a" (or "an"), "one or more" and "at least one" can be used interchangeably herein. In one embodiment, the Donor plant comprises a BOD removal treatment process, preferably a CAS process. In a preferred embodiment, the Donor plant is an activated sludge system operated under substantially non-nitrifying conditions, and second stage activated sludge system operated under nitrifying conditions. A portion of the waste sludge from the second stage system is directed to or donated to the Receiver plant. As used herein, a portion means all, or some part less than 100%.

The first activated sludge process could be replaced with other high rate conventional secondary treatment processes for BOD removal, such as high purity oxygen activated sludge or trickling filters. Such processes may or may not include a secondary clarifier. The essential elements of the BOD removal treatment process are BOD, solids, and optionally phosphorus reduction.

Figure 1:
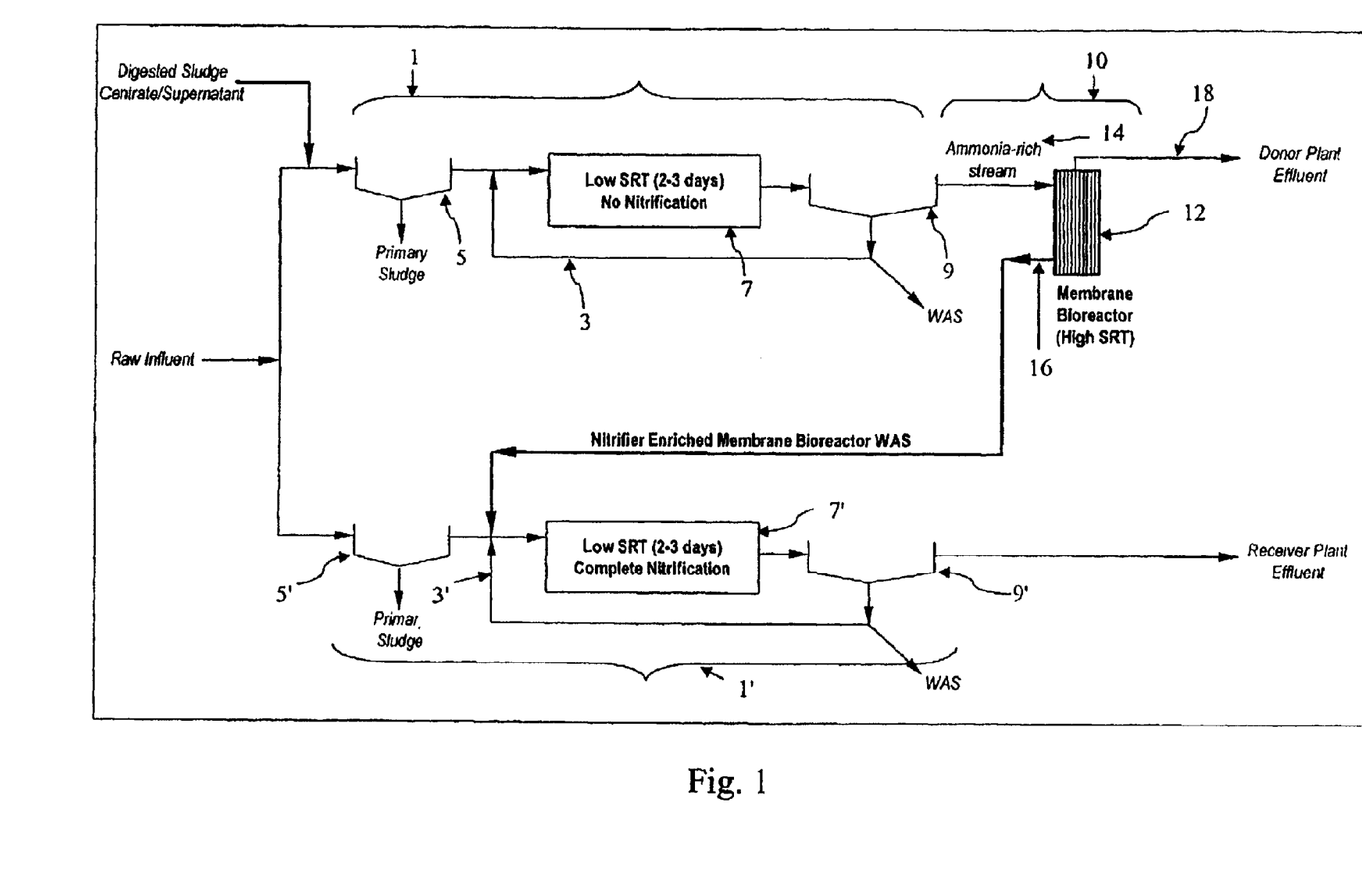
FIG. 1 shows a schematic of the new process configuration.

An exemplary schematic of the new process configuration is presented in FIG. 1. In the general case presented, the wastewater treatment plant comprises two CAS treatment trains (1, 1'), each having a separate return activated sludge (RAS) (3, 3'). One is the Donor Plant, and the other is the Reciever Plant. Anaerobic digestion is employed for primary and waste activated sludge (WAS) treatment. The CAS comprises a primary clarifier (5), an aeration tank (7), and a secondary clarifier (9). Due to limitations in aeration and secondary clarification tankage, the CAS systems are operated at SRTs that virtually or completely prohibit nitrification from proceeding. In some embodiments, the SRT is on the order of about 2 to 3 days. The operating SRT however, can vary depending on a number of factors, and may be as low as about one day, or as high as about 5 days or higher. Operation at higher SRTs could result in excessively high mixed liquor suspended solids (MLSS) concentrations (above approximately 3,000 mg/L,) and this could result in failure of the secondary clarifiers due to excessive solids loading rates. Nitrification does not occur in the Donor CAS plant to any appreciable degree. This lack of nitrification in the first stage CAS system maintains the ammonia concentration of the effluent from this system (i.e. influent to the second stage activated sludge system) relatively close to that of the influent wastewater (i.e. typically 10 to 60 mg/l of ammonia).

To allow the Donor Plant to fully nitrify, a second stage activated sludge system (10) is implemented and operated at a sufficiently high SRT (e.g. 10–20 days or higher) to ensure essentially complete nitrification (i.e. typically less than 2 mg/L effluent ammonia) throughout the year. As used herein, in one embodiment, essentially complete nitrification results in a final effluent ammonia concentration of less than or equal to 10 mg/l, 8 mg/l, or 6 mg/l. In a more preferred embodiment, essentially complete nitrification results in a final effluent ammonia concentration of less than or equal to 4 mg/l. In a particularly preferred embodiment, essentially complete nitrification results in a final effluent ammonia concentration of less than or equal to 2 mg/l, or less than 1 mg/l.

The second stage activated sludge system (10) comprises a second stage reactor for nitrification (12), an inlet path for effluent from the CAS (14), a waste sludge stream path (16), which may be conduit that is either closed or open, directed toward the second CAS (1), and an effluent path of the donor plant (18).

The influent to the second stage system is secondary effluent, which is low in solids and biological oxygen demand (BOD) (i.e. typically less that 10 mg/L), and has an ammonia concentration that is similar to the influent wastewater. Optionally, the digester recycle stream may be added to the influent wastewater stream. In this case, the ammonia concentration may be slightly higher, on the order of 5 mg/L higher.

Growth of nitrifying bacteria results in the second stage from the oxidation of ammonia to produce an enriched culture of nitrifying bacteria. Nitrification can occur in numerous ways utilizing different equipment. Some examples are trickling filters, rotating biological contactors, sequencing biological reactors and the like, some of which may include settlement basins or clarifiers. Although numerous process arrangements are possible with this second stage system, a membrane bioreactor is preferred for the following reasons: one, enriched cultures of nitrifying bacteria are known to possess poor settling characteristics (U.S. Environmental Protection Agency, 1993); and two, a second stage membrane bioreactor requires a much smaller footprint than other arrangements, such as an aeration tank and secondary clarifier. The small footprint is advantageous when space is limited due to cost or other concerns. The small footprint is especially advantageous in the case where an existing wastewater treatment plant is to be upgraded to provide nitrification in accordance with the present invention.

To allow the second plant to nitrify, the waste sludge from the membrane bioreactor (i.e. the "Donor" reactor), which is rich in nitrifying bacteria, is directed to the aeration tank (7') of the second CAS system (i.e. "Receiver" reactor) via the waste sludge effluent path (16) to allow complete nitrification. Because the membrane bioreactor WAS is predominantly comprised of nitrifiers, while being relatively low in non-nitrifier solids (compared to conventional nitrifying activated sludge systems), this seeding process has a negligible effect on the solids concentration of the Receiver reactor.

Steady-state simulations

Figure 3:
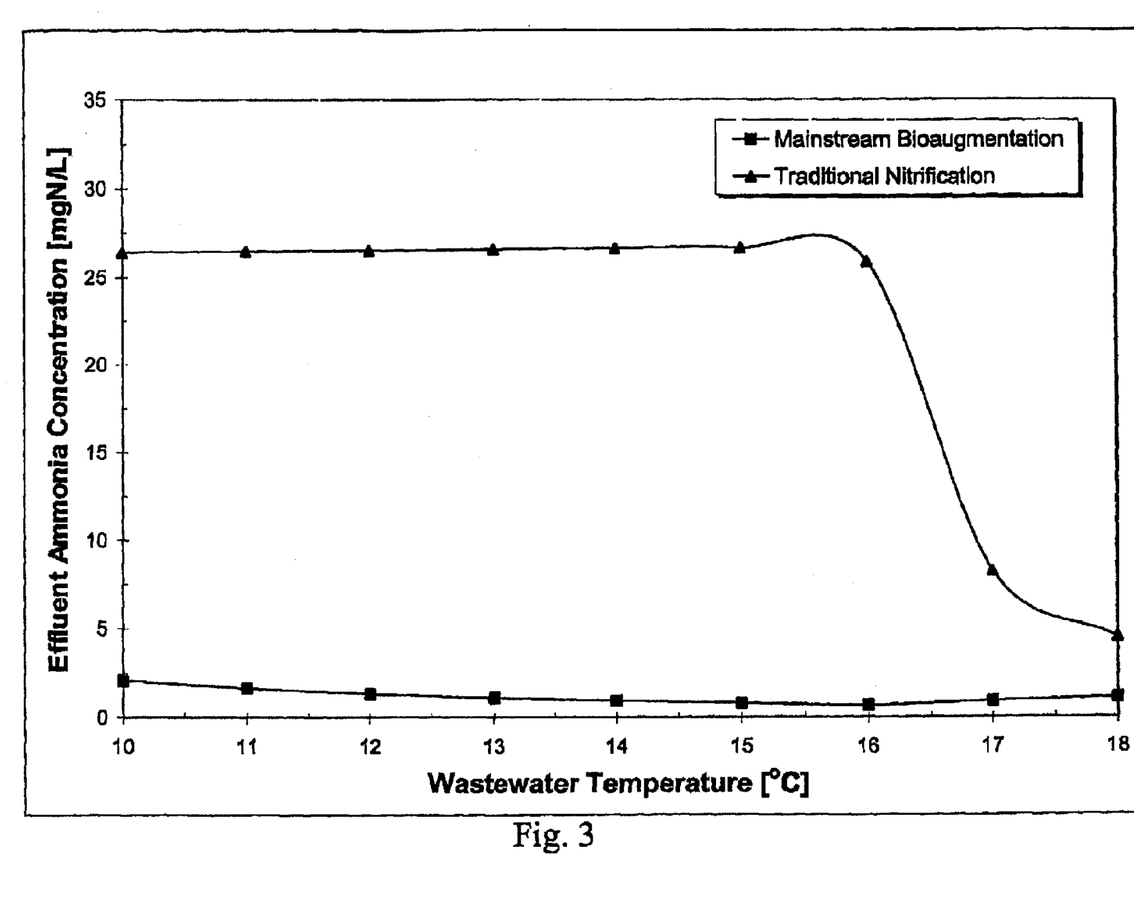
FIG. 3 is a plot of the effluent ammonia concentration vs. wastewater temperature for a the current process as compared to a traditional nitrification process.

As described in Example 1.A., steady-state simulations were performed in order to ascertain the performance of the novel process configuration of the present invention. It was assumed that the existing conventional activated sludge plant could operate at a maximum SRT of 3 days, due to restrictions in the maximum MLSS at which the plant could operate. FIG. 3 plots effluent ammonia concentrations under steady-state operation of the systems, as a function of the wastewater temperature, while maintaining a constant 3 day SRT in the CAS process trains. The following observations can be made related to the results shown in FIG. 3.

Temperature induced washout of nitrifying bacteria in a traditional nitrification system occurs at temperatures below 17° C. The percent nitrification in this system rapidly falls to zero below this temperature to the point where no nitrifiers are present at 15° C. This steep washout curve is typical of nitrification systems, and as a consequence, nitrification has gained the reputation of being an all-or-none phenomenon (Grady et al, 1999).

The new process performed significantly better than prior art processes. The primary reason for this improved nitrification performance is that in the new process, substantially more nitrifiers are formed in the donor tank than in other processes that utilize seeding. The new process produces most of its seeding nitrifiers from ammonia derived from the influent wastewater, with some supplementary production related to ammonia arising from the digester recycle stream. In Example 1.A, the nitrifier seeding rate was approximately 2.9 mg of nitrifiers per liter of wastewater flow to the Donor reactor. This seeding rate will vary based on a number of factors including the influent ammonia concentration, the digester recycle flow and ammonia concentration, among others, and will be evident to one skilled in the art. In most common situations, the seeding rate will vary in a range of about 0.1–5, but may be somewhat outside the range in other environments.

A slight increase in effluent ammonia concentration from the new bioaugmentation process occurred as wastewater temperature was increased above 16° C. The reason for this is a direct result of the Donor CAS system beginning to nitrify on its own at temperature above 16° C., thereby reducing the mass of nitrifiers produced in the membrane bioreactor, which ultimately results in a concomitant decrease in the mass of nitrifiers available for seeding. Thus, the temperature of the Donor plant should be maintained at a level that will minimize or substantially prevent nitrification prior to the delivery of the effluent to the second stage bioreactor. At temperatures of about 15–20° C. nitrification may occur, but the level of nitrification is dependent on a number of factors other than temperature, such as oxygen concentration, known to those of skill in the art. Accordingly, some range of temperatures in the Donor plant is permissible.

FIG. 3 also demonstrates that the SRT of the traditional nitrification systems have to be increased to meet the required effluent concentration of 2 mg/L at the design wastewater temperature of 12° C. No changes in the SRT of the existing treatment systems would be required with the new bioaugmentation process to meet this effluent criterion. Thus, the new process is especially well suited to colder climates, and will perform well at low temperatures.

It is important to note that the MLSS of the Receiver reactor would increase by only approximately 3 percent with the inclusion of the nitrifier enriched waste stream from the Donor membrane bioreactor. This small increase is mainly due to the high level of enrichment of nitrifiers in the Donor membrane reactor, due to the presence of low concentrations of organic material and inerts and high levels of nitrogen in the secondary effluent from the CAS system.

Figure 4:
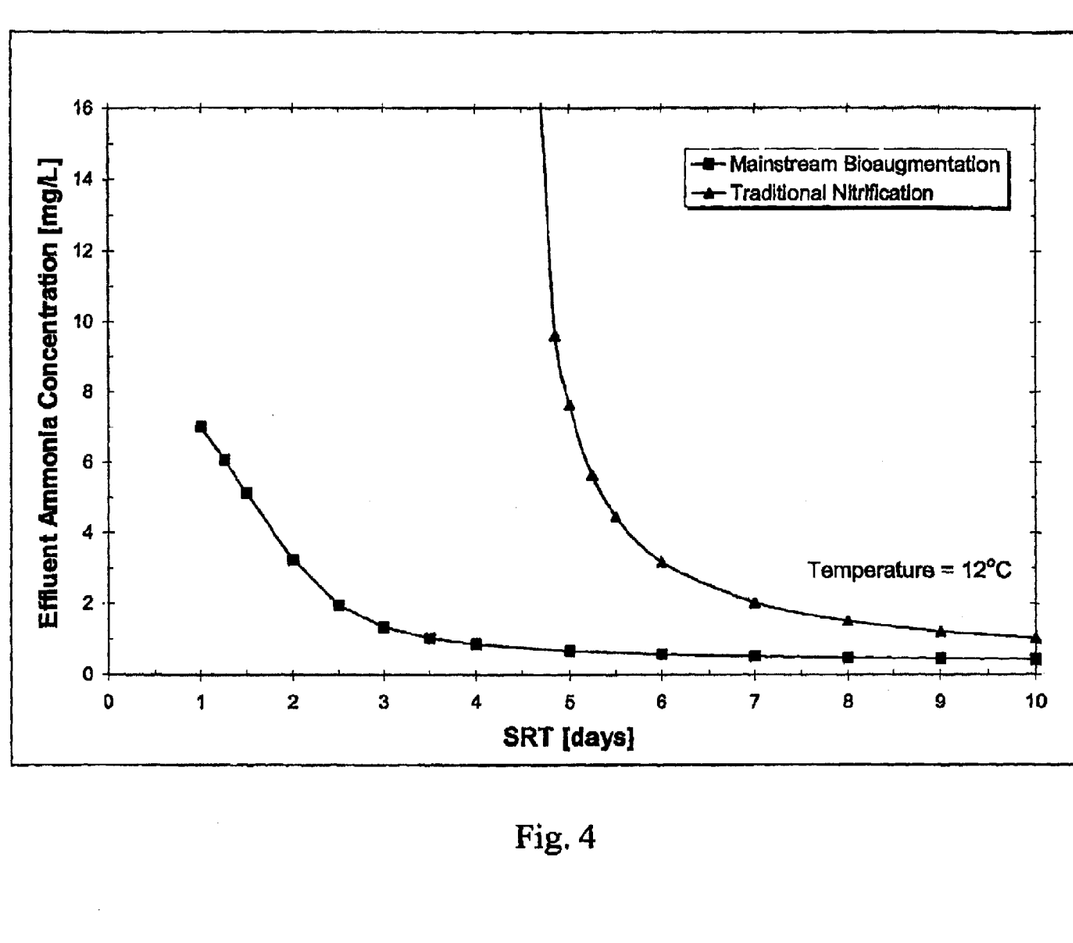
FIG. 4 shows the results of a steady state simulation for a traditional nitrification process as compared to the current process, and plots effluent ammonia concentration vs. SRT.

FIG. 4 plots effluent ammonia concentration as a function of SRT at the design wastewater temperature of 12° C. The following observations can be made related to the results shown in FIG. 4.

SRT induced washout of nitrifying bacteria in the traditional nitrification system begins to occur at SRTs below 6 days. The percent nitrification in this system decreases rapidly as SRT is further reduced to the point where no nitrifiers are present at an SRT of 4.5 days.

The new process configuration has a gradual effluent ammonia curves as SRT is decreased. Again, this results from the fact that nitrifier washout is prevented in bioaugmentation systems as long as nitrifier seeding is maintained.

The new bioaugmentation process configuration required substantially lower SRTs in the Receiver reactor to achieve complete nitrification. In fact, this new process was capable of achieving the effluent ammonia requirement of 2 mg/L at 12° C. when the Receiver plant was operated at an SRT of 2.5 days. This implies that with the implementation of the membrane bioreactor, no additional secondary treatment tankage is required. As mentioned above, the actual operating SRT will depend upon the needs of the specific system, including the target concentration of effluent ammonia, and temperature, among others, and will be evident to those skilled in the art.

Prior art processes would have to be operated at higher SRTs to achieve the 2 mg/L effluent ammonia requirements under these steady-state operating conditions. Therefore, additional secondary treatment tankage is required in prior systems, since the original plant operates at an SRT of about 3 days. Table 3 summarizes additional data from the steady-state simulations.

TABLE 3

Nitrification Related Steady-State Simulation Results

| | New Bioaugmentation Process | | | |
| --- | --- | --- | --- | --- |
| Variable | Donor CAS | Donor MBR | Receiver | Total/ Average |
| Effluent Ammonia [mg/L] | 32.2 | 0.47 | 3.53 | 2.0 |
| Operating SRT [d] | 3 | 20 | 2.5 | — |
| Mixed Liquor Mass [kg] | 4,226 | 1,758 | 4,976 | 9,202* |
| Nitrifier Mass [kg] | 0 | 585 | 125 | 711 |
| Nitrifier Seed Rate [kg/d] | — | — | — | 29.3 |

*In mainstream conventional activated sludge plants only. With new bioaugmentation process, total MLSS under aeration was 10,960 kg (i.e. including membrane bioreactor).

The results indicate that the new bioaugmentation process requires about 45–55 percent less secondary treatment mixed liquor than prior art processes, while achieving equivalent effluent ammonia concentrations. When the nitrifier seeding reactors are included in the analysis, the new process requires about 54–60% percent less mixed liquor than prior art systems. Therefore, prior art nitrification systems would require substantially more secondary treatment tankage than the new process to meet the effluent ammonia requirements Despite the lower mixed liquor mass, the new process maintains substantially higher (about 50–105% higher) nitrifier populations than prior art processes. For this reason, it was hypothesized that the new process would perform even better when modelled under dynamic loading conditions compared to these steady-state results.

The following summarizes the benefits related to the new bioaugmentation process presented herein compared prior art processes.

Operating the Donor membrane reactor at a high SRT (about 20 days) provides extremely low effluent ammonia concentration, in this case, for 50 percent of the flow. The high nitrifier mass residing in the membrane bioreactor also affords some flexibility in seeding rate over a short-term period, should an upset in the Receiver reactor arise (e.g. short-term poor nitrification performance due to an industrial discharge).

The seeding sludge from the new bioaugmentation process has a higher fraction of nitrifiers (and therefore a lower fraction of inert and other non-nitrifier particulate material) than prior art seeding systems. Therefore, seeding in the new bioaugmentation process has less impact on the MLSS concentrations in the receiver reactor(s). In the example shown, the seed sludge consisted of approximately 25 percent nitrifying bacteria. This fraction will vary based upon a number of factors including the Donor CAS effluent constituents, the SRT of the second stage activated sludge system, among others, and will be evident to one skilled in the art.

Supplemental alkalinity will not normally be required with the new bioaugmentation process, thus simplifying the system, and resulting in a cost savings.

The bioaugmentation seeding reactor of the new process operates at ammonia concentrations that are typical of municipal influent wastewaters (i.e. 10–60 mgN/L), and therefore, substrate or product inhibition is not a concern as it can be in prior processes utilizing sources with higher ammonia concentrations.

Dynamic Simulations

A number of dynamic simulations were done as described in Example 1.B. to assess the performance of the new bioaugmentation process.

Figure 5:
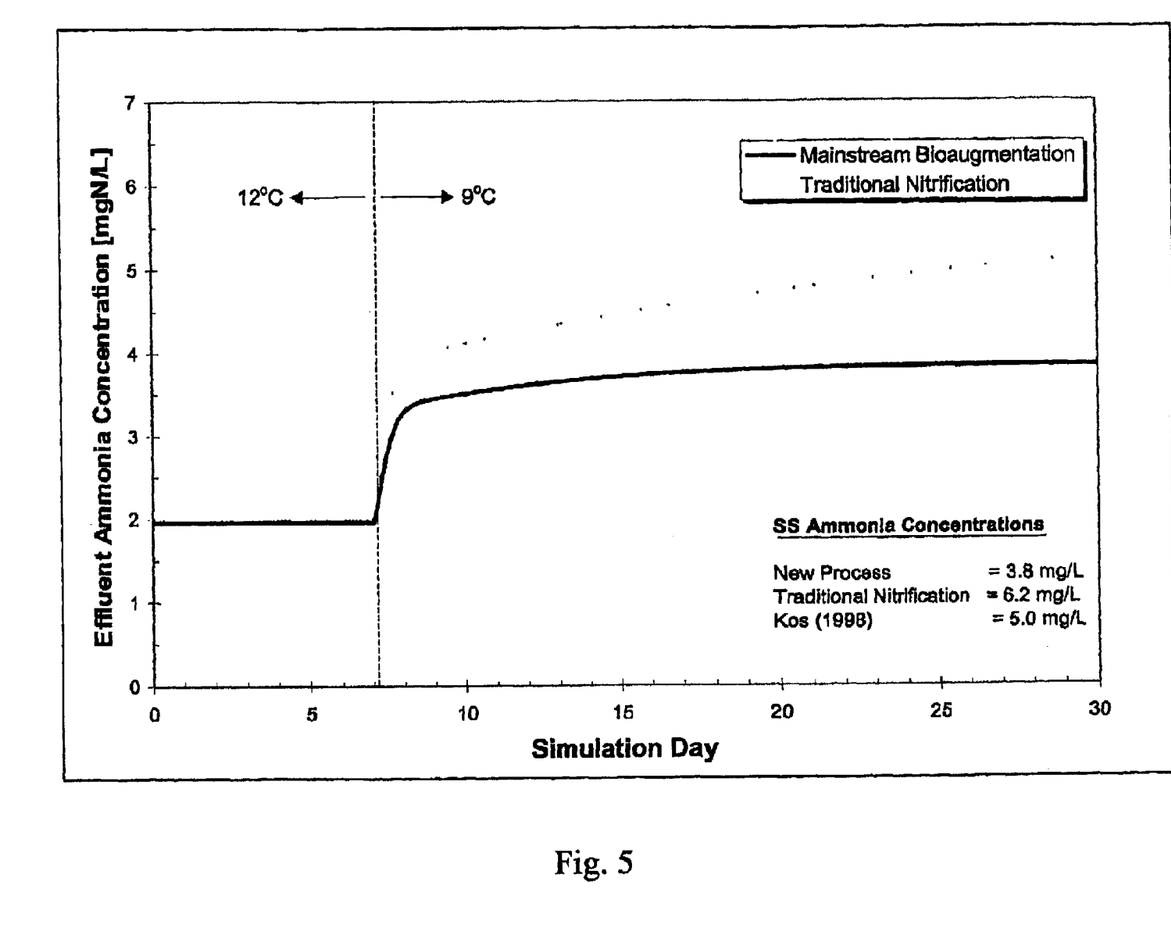
FIG. 5 shows the results of a dynamic simulation of a step decrease in wastewater temperature from 12° C. to 9° C. for a traditional nitrification process as compared to the current process.
Figure 6:
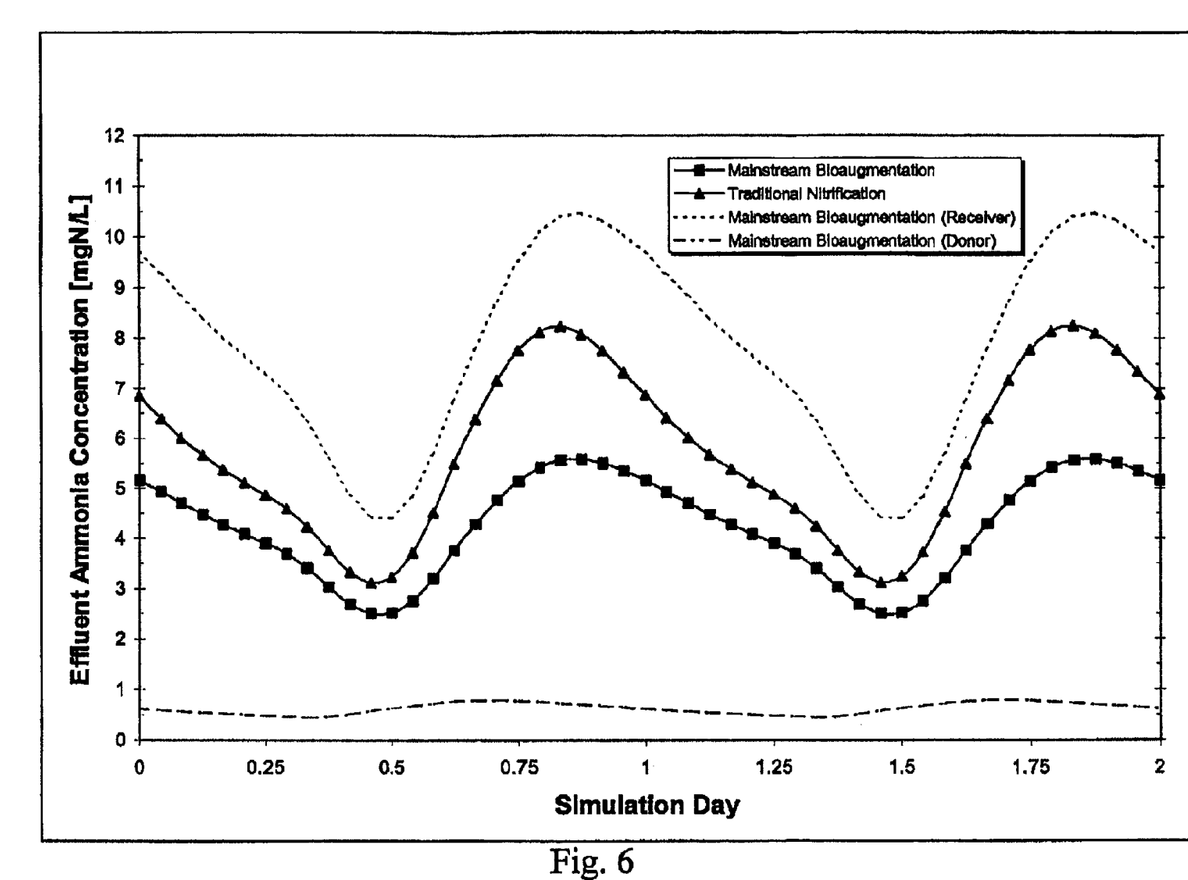
FIG. 6 shows the results of a dynamic simulation under diurnal flow and loading conditions for a traditional nitrification process as compared to the current process.
Figure 7:
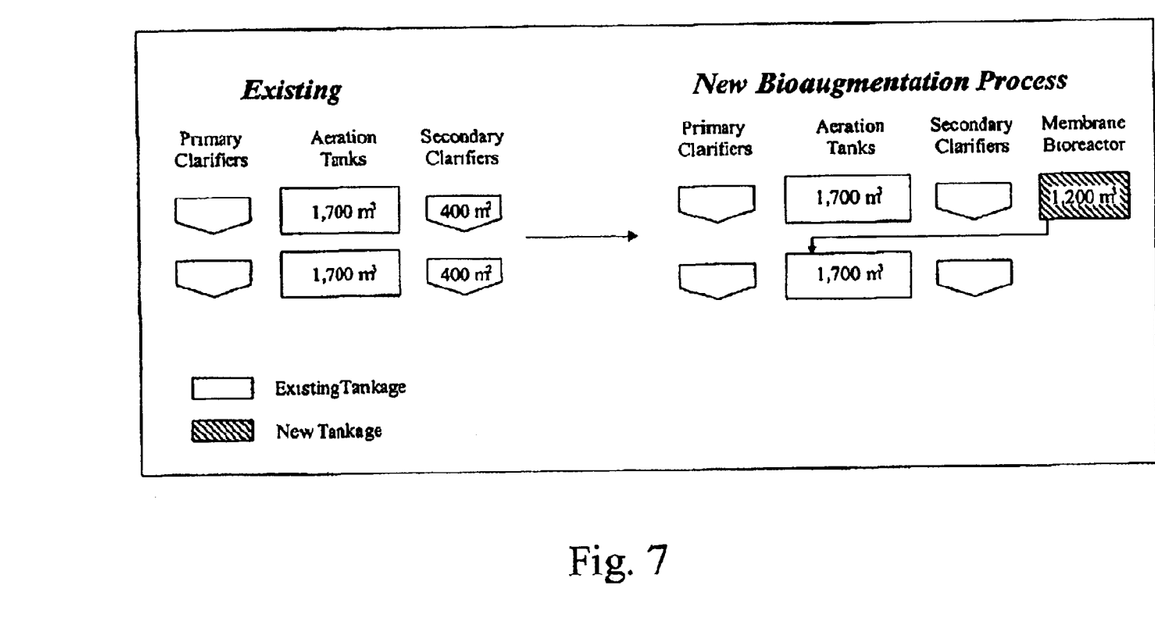
FIG. 7 shows a conceptual schematic of a nitrification upgrade based on this present invention.

FIG. 5 shows the results for the simulation that included a step change in wastewater temperature from 12° C. to 9° C., while maintaining all other variables constant. The main purpose of evaluating the effects of such a drastic step change, which in reality is unlikely to occur, was to test the resilience of the systems to rapidly varying conditions. In fact, the results presented in FIG. 5 would be similar if a sudden drop in the maximum specific growth rate of nitrifiers occurred in the plant, which could occur as a result of inhibitory substances. FIG. 6 shows the results from the simulation that incorporated a step change in influent ammonia concentration (i.e. an increase by 25%), while maintaining all other variables constant. All simulations are started at a 12° C. steady-state operation, which resulted in all systems achieving an effluent ammonia concentration of 2 mg/L, before the step change was initiated.

FIG. 5 demonstrates that the new process configuration is capable of handling variations in wastewater temperature. This was expected and is a direct result of this process configuration maintaining a large population of nitrifying bacteria, larger than prior art processes.

Dynamic simulations under typical diurnal variations in flow and loading were done to assess the performance of the new process configuration. Simulations were first done for each of the three options using the same SRTs that allowed the 2 mg/L effluent ammonia criterion to be achieved during the steady-state modeling. The results of these simulations are presented in FIG. 6. As seen in FIG. 6, the Donor membrane reactor tends to dampen variations in influent loading, and therefore, even though the Receiver reactor effluent quality suffers at times, the combined effluent still has very low ammonia concentrations.

To achieve the same flow weighted effluent ammonia concentration, the SRT of the prior art systems would have to be increased from three days to anywhere from 5.5–8.2 days.

Design Implications

Typically, membrane bioreactors treating either raw sewage or primary effluent are operated at a target mixed liquor solids concentration of 10,000 mg/L (Crawford, et al. (2000). Membrane Bioreactors—A Designer's Perspective. *Proceedings of the 29th WEAO Conference and Technical Symposium, Hamilton, Ontario.*). In doing so, the aeration tankage can be reduced substantially compared to conventional activated sludge, while not exceeding the maximum sustainable volumetric oxygen transfer rate of 100 mg/L-hr (Grady et al, 1999). The membrane bioreactor proposed with the new bioaugmentation process has relatively high oxygen requirements, mainly due to nitrification, while achieving a low observed yield. The simulations have demonstrated that the volumetric oxygen transfer rate will normally govern the size of the membrane bioreactor of the new bioaugmentation process. Based on the influent flows and wastewater characteristics presented in Table 1, the minimum membrane bioreactor volume would be 1,200 m$^3$, which would result in an average MLSS of 1,465 mg/L. By operating the membrane bioreactor at these lower mixed liquor concentrations and on secondary effluent, it is hypothesized that the membrane flux will be significantly greater than systems that operate at 10,000 mg/L, thereby resulting in a decrease in required membrane area compared to typical membrane bioreactor systems treating domestic wastewater. Table 4 summarizes the average membrane bioreactor influent and operating conditions at the design winter wastewater temperature of 12° C.

TABLE 4

Donor Plant Membrane Bioreactor Operating Conditions at 12° C.

| Membrane Bioreactor Design | Operating Value |
| --- | --- |
| Operating Conditions | |
| SRT | 20 days |
| Tank Volume | 1,200 m$^3$ |
| Nitrifier Biomass Concentration | 340 mg/L |
| TSS Concentration | 1,465 mg/L |
| Oxygen Uptake Rate (OUR) | 51 mg/L-hr* |
| Average Influent Characteristics | |
| Flow | 10,000 m$^3$/d |
| Ammonia Concentration | 32.0 mg/L |
| TSS Concentration | 8.5 mg/L |
| BOD Concentration | 3 mg/L |

*Under maximum loading conditions, the OUR is approximately 100 mg/L-hr.

The results of the dynamic simulations with the diurnal influent flow pattern indicated that the SRTs of prior art processes would have to be increased from about 17 to about 25 percent respectively) to provide the same performance to that of the new process. Table 5 summarizes the process requirements based on the results of these dynamic simulations.

TABLE 5

Process Requirements Based on Dynamic Simulation Results

| | New Bioaugmentation Process | | | |
| --- | --- | --- | --- | --- |
| Variable | Donor CAS | Donor MBR | Receiver | Total/ Average |
| Operating SRT [d] | 3 | 20 | 2.5 | — |
| Mixed Liquor Mass [kg] | 4,226 | 1,758 | 4,976 | 9,202* |
| Nitrifier Mass [kg] | 0 | 583 | 125 | 711 |

*In mainstream conventional activated sludge plants only. With new bioaugmentation process, total MLSS under aeration was 10,960 kg (i.e. including membrane bioreactor).

These results indicate that for these influent wastewater characteristics and operating conditions, prior art processes require about 2.2 to 2.5 times the mainstream activated sludge mass, as compared to the new bioaugmentation process configuration. Therefore, the aeration tankage requirements for these processes also have to be about 2.2 to 2.5 times that of the new bioaugmentation.

The present invention further provides a method for modifying an activated sludge process configuration to enhance ammonia nitrification. In one embodiment, a nitrification upgrade with the new bioaugmentation process would require about 50 percent of the tankage of a comparable nitrification upgrade by way of the traditional methods, based on the design criteria of not exceeding an effluent ammonia concentration of 2.0 mg-N/L at 12° C. in a plant treating a variable ammonia load throughout the day. In a preferred embodiment, the upgrade would require about 40 percent of the tankage of a comparable nitrification upgrade. In other embodiments, with increasing preference, the upgrade would require about 35, 30, 25, or 20% percent of the tankage of a comparable nitrification upgrade. In a preferred embodiment, in terms of total aeration and donor plant tankage, the new process would require about 54 to 58 percent of the volumetric requirements of comparable systems based on the traditional approaches.

Some of the advantages of the bioaugmentation process are as follows: The new bioaugmentation process produces an enriched culture of nitrifying bacteria in the second stage membrane bioreactor, which can be used to augment the nitrifier population of parallel short SRT systems. The use of augmentation allows the shorter SRT systems (i.e. Receiver plants) to nitrify with a substantially lower mixed liquor mass, thereby providing savings in secondary treatment tankage. Based on the design criteria and operation conditions presented herein, a nitrification upgrade with the new bioaugmentation process would require about 25% percent of the new tankage of a comparable traditional nitrification upgrade.

The following examples are provided to further assist those of ordinary skill in the art. Such examples are intended to be illustrative and therefore should not be regarded as limiting the invention. A number of exemplary modifications and variations are described in this application and others will become apparent to those of skill in this art. Such variations are considered to fall within the scope of the invention as described and claimed herein.

EXAMPLES

Example 1

Simulations

A nitrification upgrade scenario was developed to compare the upgrading of an existing non-nitrifying plant to achieve year round nitrification using a conventional approach (i.e. building additional aeration tanks and secondary clarifiers), using the approach described by Kos (1998), and using the proposed nitrifier bioaugmentation process, as described in FIG. 1. Simulations were done under both steady-state and dynamic conditions.

A. Steady-State Simulations

The existing plant is assumed to comprise two CAS systems, each with aeration and secondary tankage sized for BOD and chemical phosphorus removal only. More specifically, each train can operate at a maximum SRT of 3 days, which results in a mixed liquor suspended solids concentration of approximately 3,000 mg/L. For this scenario, it was assumed that the plant will be required to nitrify on a year round basis down to an ammonia concentration of 2.0 mg/L. For all simulations, it was assumed that the average dissolved oxygen concentration in the aeration tanks was 3 mg/L. Table 1 summarizes the wastewater characteristics and existing plant tankage sizes for each train.

TABLE 1

Wastewater Characteristics and Existing Tankage Sizing

| Existing Plant - Each Train | Design Value |
|---|---|
| Ave. Raw Influent Characteristics | |
| Influent Flow (total) | 20,000 m³/d |
| Influent Flow to Each Train | 10,000 m³/d |
| Max:Ave Influent Flow | 2:1 |
| BOD Concentration | 200 mg/L |
| TSS Concentration | 200 mg/L |
| TKN Concentration | 35 mg/L |
| Ammonia Concentration | 28 mg/L |
| Total Phosphorus | 5 mg/L |
| Winter Wastewater Temperature | 12° C. |
| Summer Wastewater Temperature | 18° C. |
| Ave. Dewatering Filtrate Characteristics | |
| Flow | 410 m³/d |
| BOD Concentration | 400 mg/L |
| TSS Concentration | 150 mg/L |
| TKN Concentration | 314 mg/L |
| Ammonia Concentration | 300 mg/L |
| Tankage Sizing | |
| Aeration Tank Volume | 1,700 m³ |
| Aeration HRT | 4.1 hrs |

A traditional nitrification upgrade would comprise operating the plant at a higher SRT to meet the stated effluent requirements and providing additional aeration and/or secondary clarifier tankage as required. The simulations done for this approach entailed determining the secondary effluent ammonia concentration as a function of the SRT at which the plants were operated. This procedure was carried through for different operating temperatures for the CAS systems. Based on the resulting MLSS inventory, a total bioreactor volume was calculated such that the resulting MLSS concentration would not exceed 3,000 mg/L.

The proposed bioaugmentation upgrade scenario would comprise implementing a second stage membrane bioreactor, operated at a 20 day SRT, which is sufficient to ensure complete nitrification regardless of operating conditions. The SRT of the Receiver reactor was varied and the ammonia concentration resulting from the combination of the membrane bioreactor effluent and from the Receiver bioreactor effluent, was calculated for different operating temperatures.

The simulations were carried out using Biowin™ (EnviroSim Associates Ltd., Flamborough, Ontario). The inputs to Biowin™ are presented in Table 2, for the primary effluent and for the recycle stream. The inert suspended solids concentration in the primary effluent reflects not only the presence of this type of material in the incoming wastewater to the plant, but also the fact that the simulations were performed for a wastewater plant that has chemical addition to the bioreactor for chemical phosphorus removal. This was necessary to account for the formation of the chemical precipitate within the MLSS.

TABLE 2

Wastewater Composition as used in the Biowin ™ Simulations

|  | Primary Effluent | Recycle Stream |
|---|---|---|
| Component Concentration |  |  |
| COD (mg-COD/L) | 323 | 397 |
| TKN (mg-N/L) | 32 | 314 |
| TP (mg-P/L) | 3.5 | 73 |
| ISS (mg/L) | 45 | 133 |
| Alkalinity (mol/L) | 7.0 | 21.5 |
| Wastewater Fractions |  |  |
| Fbs | 0.39969 | 0.08954 |
| Fac | 0.66667 | 0.55089 |
| Fxsp | 0.53702 | 0.73725 |
| Fus | 0.06972 | 0.05679 |
| Fup | 0.10565 | 0.62888 |
| Fna | 0.86802 | 0.9613 |
| Fnox | 0.42349 | 0.29964 |
| Fnus | 0.04334 | 0.00445 |
| FupN | 0.02113 | 0.00348 |
| FupP | 0.00704 | 0.00163 |
| FZbh | 0 | 0 |
| Fzba | 0 | 0 |
| FZbp | 0 | 0 |

B. Dynamic Simulations

Dynamic simulations were carried out to assess the response of the process configuration when treating a varying influent loading. Changes in wastewater temperature and influent ammonia concentration can have a significant effect on the nitrification process, and therefore, simulations incorporating step changes in wastewater temperature (12° C. to 9° C.) was performed. All other variables were maintained at their steady-state values as shown in Table 2.

Figure 2:
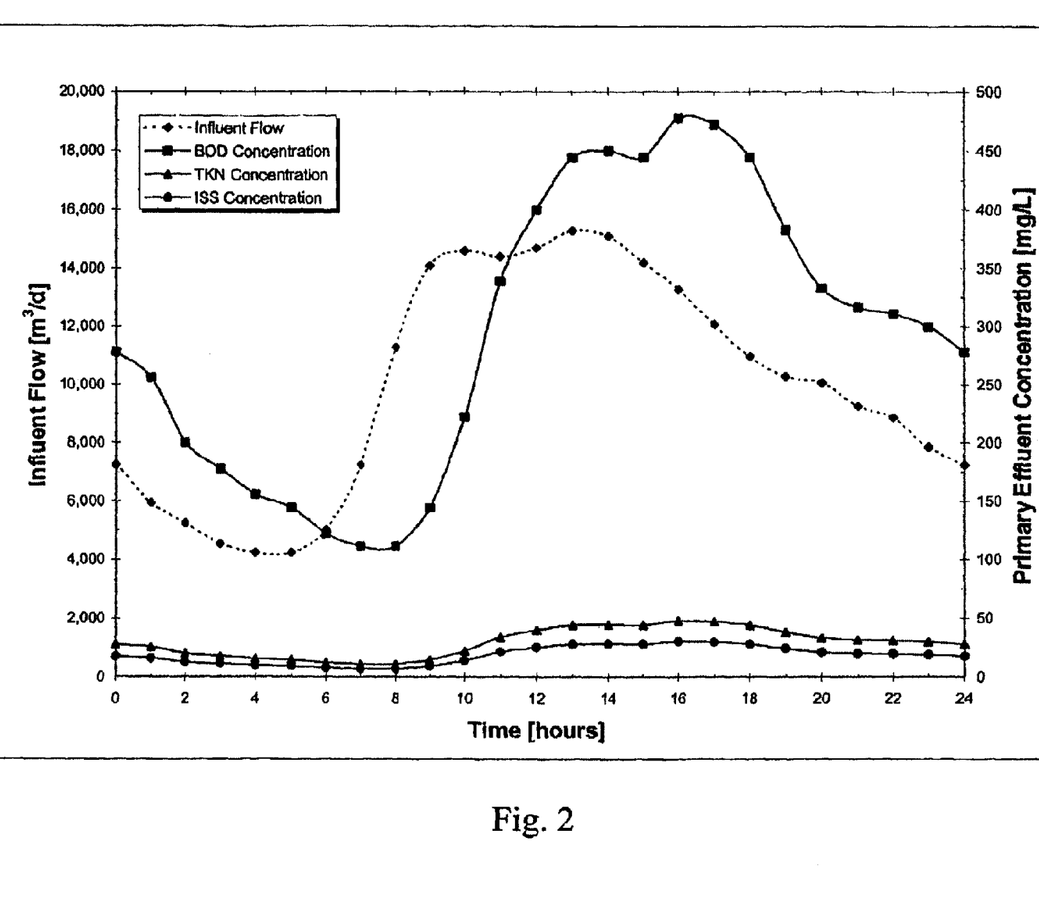
FIG. 2 is a plot of diurnal flow and loading patterns used for Biowin™ simulations.

Simulations were also carried out to determine the effect on nitrification efficiency resulting from a typical daily dynamic influent flow and loading pattern compared to steady-state operation. The diurnal pattern used in this simulation was derived from Bidstrup and Grady (1988). The actual input values in the simulations are shown in FIG. 2. It is important to note that the average flow and flow weighted average primary effluent wastewater characteristics are identical to the steady-state values as shown in Table 2. The digester recycle stream flow was maintained at a constant rate, which is representative of what would occur at a treatment plant.

The process configuration was first simulated at the same SRTs used in the steady-state simulations that resulted in an effluent ammonia concentration of 2 mg/L.

What is claimed is:

1. A method of treating wastewater to provide nitrification comprising:
    a) subjecting a first stream of influent having an ammonia concentration to a first BOD removal treatment process to yield a first effluent;
    b) subjecting a second stream of influent to a second activated sludge process;
    c) subjecting the first effluent to a second stage reactor capable of growing nitrifiers and nitrifying the first effluent to generate nitrifier-enriched effluent; and
    d) adding a portion of the nitrifier-enriched effluent to the second stream of influent to promote nitrification in the second activated sludge process.

2. The method of claim 1, wherein the second stage reactor is a membrane bioreactor.

3. The method of claim 2, wherein the membrane bioreactor operates at an SRT of not less than 10 days.

4. The method of claim 1, wherein a portion of the nitrifier-enriched effluent from the second stage reactor is directed to an aeration tank of the second activated sludge process.

5. The method of claim 1, further comprising directing effluent from a digester recycle stream to an inlet of the first BOD removal process.

6. The method of claim 1, wherein effluent from the second activated sludge process has an ammonia concentration of about 2 mg/L or less.

7. The method of claim 1, wherein the first BOD removal treatment process includes a process for removal of solids.

8. The method of claim 1, wherein the first BOD removal treatment process is an activated sludge process.

9. The method of claim 1, wherein the ammonia concentration of the first stream is substantially unaffected by the first BOD removal process.

10. A wastewater treatment plant comprising:
    a) a first BOD removal treatment process receiving a first stream of wastewater influent and emitting an effluent;
    b) a second stream activated sludge process receiving a second stream of wastewater influent;
    c) a second stage nitrification reactor receiving the effluent from the first BOD removal treatment process, the second stage nitrification reactor operating at an SRT sufficient to provide essentially complete nitrification and to grow nitrifiers; and
    d) a conduit conveying effluent containing nitrifiers from the second stage nitrification reactor to the second activated sludge process to provide nitrification in the second activated sludge process.

11. The wastewater treatment plant of claim 10, wherein the second stage nitrification reactor is a membrane bioreactor.

12. The wastewater treatment plant of claim 11, wherein the membrane bioreactor operates at an SRT of not less than 10 days.

13. The wastewater treatment plant of claim 10, wherein the effluent containing nitrifiers from the second stage reactor is directed to an aeration tank of activated sludge process.

14. The wastewater treatment plant of claim 10, further comprising a digester recycle stream in liquid communication with the intake of the first activated sludge process.

15. The wastewater treatment plant of claim 10, wherein effluent from the second activated sludge process has an ammonia concentration of about 2 mg/L or less.

16. A method for modifying an activated sludge process configuration to enhance nitrification of ammonia, comprising:
    a) providing an existing wastewater treatment plant comprising a first activated sludge process and a second activated sludge process;
    b) providing a second stage reactor for nitrification and to grow nitrifiers in fluid communication with an effluent from the first activated sludge process; and
    c) providing a means for directing at least a portion of the effluent from the second stage reactor to the second activated sludge process.

17. The method of claim 16, wherein the second stage reactor is a membrane bioreactor.

* * * * *